United States Patent [19]
Brown et al.

[11] Patent Number: 6,044,779
[45] Date of Patent: Apr. 4, 2000

[54] MULTIPLE DROP SEED DISC

[75] Inventors: Thomas Brown, Plainfield; Guntis Ozers, Woodridge; Lisle J. Dunham; Joseph A. Michalic, both of Downers Grove, all of Ill.

[73] Assignee: Case Corporation, Racine, Wis.

[21] Appl. No.: 09/170,836

[22] Filed: Oct. 13, 1998

Related U.S. Application Data

[63] Continuation-in-part of application No. 09/061,084, Apr. 15, 1998.

[51] Int. Cl.$^7$ ............................................. A01C 7/04
[52] U.S. Cl. ................................... 111/185; 221/211
[58] Field of Search ........................... 111/185, 184, 111/183, 177, 200; 221/211, 266, 264

[56] References Cited

U.S. PATENT DOCUMENTS

| | | |
|---|---|---|
| 1,331,235 | 2/1920 | Bristow . |
| 1,591,637 | 7/1926 | Matheson . |
| 1,651,605 | 12/1927 | Kuhn et al. . |
| 2,723,742 | 11/1955 | Marshall . |

(List continued on next page.)

FOREIGN PATENT DOCUMENTS

| | | |
|---|---|---|
| 0 140 701 A2 | 5/1985 | European Pat. Off. . |
| 0 141 638 A2 | 5/1985 | European Pat. Off. . |
| 0 141 701 A1 | 5/1985 | European Pat. Off. . |
| 0 536 543 A1 | 4/1993 | European Pat. Off. . |
| 1410390 | 8/1965 | France . |
| 2135702 | 12/1972 | France . |
| 2376607 | 8/1978 | France . |
| 25 17 758 A1 | 11/1976 | Germany . |
| 1045-834 | 10/1983 | U.S.S.R. ................................ 111/185 |
| 802899 | 10/1958 | United Kingdom . |

OTHER PUBLICATIONS

Four Photographs of Nodet and Deere Seed Meters, 1994–1995.
Brochure, Maxemerge Plus Planters: Strength, Accuracy, and Convenience. Design by John Deere of Deere & Company. 1996.
Brochure, Planter Attachments for Maxemerge Plus, Maxemerge2, and Maxemerge Planters. Design by John Deere of Deere & Company, Jan. 1997.
Brochure. New Planter . . . New Sales Advantages. Design by John Deere of Deere & Company, May 1995.
Brochure. Dickey–John High Rate Seed Sensors. Design by Dickey–John Corporation. Date Unknown.
Brochure. White 6000 Series Planters. Design by White–New Idea. 1993.
Brochure. White 6200/6300 Series Planters. Design by White–New Idea. 1995.
Brochure. White 6800 Series Central Fill. Design by White–New Idea. 1995.
Brochure. Kinze 2000 Series Planters. Design by Kinze Manufacturing, Inc., Aug. 1996.
Brochure. Kinze 2000 Series Planters. Design by Kinze Manufacturing, Inc., Aug. 1993.
Brochure. IS249 Kinze Brush–Type Seed Meter Installation, Operation & Maintenance. Design by Kinze Manufacturing, Inc. Aug. 1992.

(List continued on next page.)

*Primary Examiner*—Christopher J. Novosad
*Attorney, Agent, or Firm*—Brinks Hofer Gilson & Lione

[57] ABSTRACT

A multiple seed drop disc includes a disc member including a vacuum side and a seed side. The vacuum side includes a plurality of spaced-apart recesses formed therein. The seed side includes a plurality of clusters formed therein. Each cluster includes a plurality of openings which communicates with one of the recesses.

11 Claims, 5 Drawing Sheets

U.S. PATENT DOCUMENTS

| | | | |
|---|---|---|---|
| 2,880,906 | 4/1959 | Probasco . | |
| 3,156,201 | 11/1964 | Tweedale . | |
| 3,412,908 | 11/1968 | Ferrault . | |
| 3,434,437 | 3/1969 | Mark et al. . | |
| 3,533,535 | 10/1970 | Knapp . | |
| 3,552,601 | 1/1971 | Hansen et al. . | |
| 3,596,615 | 8/1971 | Fisher . | |
| 3,608,787 | 9/1971 | Grataloup . | |
| 3,627,050 | 12/1971 | Hansen et al. . | |
| 3,659,746 | 5/1972 | Winslow . | |
| 3,680,737 | 8/1972 | Zagotta et al. | 221/211 |
| 3,693,833 | 9/1972 | Weitz | 221/211 |
| 3,789,575 | 2/1974 | Bross | 221/211 X |
| 3,796,346 | 3/1974 | Ribouleau | 221/211 |
| 3,820,666 | 6/1974 | Nye et al. | 221/211 X |
| 3,888,387 | 6/1975 | Deckler | 221/278 |
| 3,990,606 | 11/1976 | Gugenhan | 221/211 |
| 3,999,690 | 12/1976 | Deckler | 221/211 X |
| 4,018,358 | 4/1977 | Johnson et al. | 221/211 X |
| 4,019,651 | 4/1977 | Starr et al. | 221/211 |
| 4,029,235 | 6/1977 | Grataloup | 221/211 |
| 4,047,638 | 9/1977 | Harrer et al. | 221/266 |
| 4,074,830 | 2/1978 | Adams et al. | 221/266 |
| 4,091,964 | 5/1978 | Harrer | 221/266 |
| 4,148,414 | 4/1979 | Parks, Jr. | 221/278 |
| 4,162,744 | 7/1979 | Barker et al. | 222/251 |
| 4,239,126 | 12/1980 | Dobson et al. | 221/211 |
| 4,241,849 | 12/1980 | Harrer | 221/266 |
| 4,251,011 | 2/1981 | Hamilton et al. | 221/211 |
| 4,286,530 | 9/1981 | Conley | 111/1 |
| 4,314,515 | 2/1982 | Jimenez et al. | 111/77 |
| 4,363,423 | 12/1982 | Larsen | 221/82 |
| 4,399,757 | 8/1983 | Maury . | |
| 4,403,713 | 9/1983 | Herriau | 221/265 |
| 4,449,642 | 5/1984 | Dooley | 221/211 |
| 4,450,979 | 5/1984 | Deckler | 221/263 |
| 4,469,244 | 9/1984 | Maury | 221/200 |
| 4,503,786 | 3/1985 | Taulfest | 111/86 |
| 4,508,243 | 4/1985 | Deutsch et al. | 222/242 |
| 4,511,061 | 4/1985 | Gaspardo | 221/211 X |
| 4,515,291 | 5/1985 | Holmes | 221/211 |
| 4,519,525 | 5/1985 | Wunschl et al. | 221/211 |
| 4,533,066 | 8/1985 | Holmes et al. | 221/211 |
| 4,569,486 | 2/1986 | Balmer | 239/655 |
| 4,579,251 | 4/1986 | Gugenhan | 221/211 |
| 4,589,433 | 5/1986 | Abe . | |
| 4,600,122 | 7/1986 | Lundie et al. | 221/211 |
| 4,601,372 | 7/1986 | Swales et al. . | |
| 4,613,056 | 9/1986 | Olson | 221/211 |
| 4,616,577 | 10/1986 | van der Lely | 111/1 |
| 4,634,855 | 1/1987 | Friend et al. | 250/222.1 |
| 4,635,215 | 1/1987 | Friend . | |
| 4,646,939 | 3/1987 | Herriau | 221/211 |
| 4,650,093 | 3/1987 | Meyer-Bosse | 221/233 |
| 4,664,290 | 5/1987 | Martin et al. | 221/211 |
| 4,688,698 | 8/1987 | Holland | 221/211 |
| 4,697,721 | 10/1987 | Johnson et al. | 221/211 |
| 4,703,868 | 11/1987 | Shaw | 221/211 |
| 4,705,220 | 11/1987 | Gandrud et al. | 239/654 |
| 4,718,363 | 1/1988 | Williamls | 111/1 |
| 4,718,574 | 1/1988 | Schoenmaekers | 221/211 X |
| 4,793,511 | 12/1988 | Ankum et al. | 221/211 |
| 4,799,291 | 1/1989 | Ankum et al. . | |
| 4,836,412 | 6/1989 | Webber et al. | 221/211 |
| 4,896,616 | 1/1990 | Wintersteiger et al. | 221/211 X |
| 4,898,108 | 2/1990 | McDermott | 111/185 |
| 4,915,258 | 4/1990 | Olson | 221/211 |
| 4,917,029 | 4/1990 | Upadhyaya et al. | 111/185 |
| 4,924,786 | 5/1990 | Keeton | 111/184 |
| 4,928,607 | 5/1990 | Luigi | 111/185 |
| 4,949,869 | 8/1990 | Ribouleau | 221/211 |
| 4,951,838 | 8/1990 | Turner | 221/211 |
| 5,027,725 | 7/1991 | Keeton | 111/184 |
| 5,058,766 | 10/1991 | Deckler | 221/254 |
| 5,082,126 | 1/1992 | Ribouleau | 221/211 |
| 5,143,002 | 9/1992 | Gaspardo | 111/185 |
| 5,156,102 | 10/1992 | Andersen | 111/175 |
| 5,161,473 | 11/1992 | Landphair et al. | 111/176 |
| 5,170,909 | 12/1992 | Lundie et al. | 221/211 |
| 5,325,800 | 7/1994 | Wisor et al. | 111/185 |
| 5,325,801 | 7/1994 | Fiorido | 111/185 |
| 5,377,867 | 1/1995 | Schick et al. | 221/217 |
| 5,392,707 | 2/1995 | Romans | 111/185 |
| 5,392,722 | 2/1995 | Snipes et al. | 111/174 |
| 5,401,035 | 3/1995 | Schoenmaekers | 111/185 X |
| 5,501,366 | 3/1996 | Fiorido | 221/211 |
| 5,517,932 | 5/1996 | Ott et al. | 111/193 |
| 5,522,328 | 6/1996 | Long | 111/176 |
| 5,535,917 | 7/1996 | Ribouleau | 221/211 |
| 5,542,364 | 8/1996 | Romans | 111/185 |
| 5,549,060 | 8/1996 | Schick et al. | 111/178 |
| 5,601,209 | 2/1997 | Barsi et al. | 221/266 |
| 5,655,468 | 8/1997 | Ledermann et al. | 111/164 |
| 5,720,233 | 2/1998 | Lodico et al. | 111/184 |

OTHER PUBLICATIONS

Brochure. Monosem: The Precision Vacuum Planter. Design by A.T.I., Inc., Date Unknown.

Brochure. Monosem: Pneumatic Planer Operator's Manual. Design by A.T.I., Inc. Date Unknown.

Brochure, MT 600. Design by Gaspardo. Date Unknown.

Brochure. Stanhay Singulaire 785: The Precision Vacuum Seeder From Stanhay. Design by Stanhay Webb Limited. Date Unknown.

Brochure. Accord: Precision Seed Drill Optima Operating Instructions. Design by Accord Landmaschinen H. Weiste & Co. GmbH. Aug. 1992.

Brochure. WIC Precision Vacuum Planer Operator's Manual and Parts Book. Design by WIC, Inc., 1994.

Brochure. Nodet Gougis Planter II Semoirs Monograines Polyvalents. Design by Nodet Gougis., Date Unknown.

Brochure. Nodet Gougis Ventilateur. Design by Nodet Gougis, Dec. 1992.

Brochure. White Planters: Accuracy from the Ground Up. Design by White. 1997.

MULTIPLE DROP SEED DISC

RELATED APPLICATIONS

This is a continuation-in-part application of U.S. application Ser. No. 09/061,084, filed Apr. 15, 1998, the entire disclosure of which is incorporated herein by reference.

BACKGROUND OF THE INVENTION

Planting systems used in planting operations typically include a rotatable disc mounted for rotation within a hollow interior of a generally cylindrical two-piece housing mounted at the bottom of a seed hopper. Seeds from the seed hopper flow into a seed chamber within the housing on one side of the seed disc. The seed disc typically includes a plurality of openings formed therein which are located adjacent the periphery of the disc in a circumferential arrangement. As the seed disc rotates, the openings pass through the seed chamber and the seeds are drawn to the openings and are held within the openings where they are retained for later release. In a vacuum seed planting system, for example, the seeds are held in relation to the seed disc by a vacuum source coupled to a separate chamber located on the opposite side of the seed disc from the seeds in the seed chamber.

In a typical arrangement, a series of spaced apart openings located adjacent the periphery of the disc in a circumferential arrangement is provided. This allows for the release of individual seeds at a controlled rate. In some applications, it is desirable to plant several seeds in a tight group such as in the case of cotton planting on hills. To accomplish this, the seed disc must be configured to allow the simultaneous drop of several seeds.

Attempts have been made to provide a seed disc capable of releasing several seeds simultaneously including, for example, providing a disc having a plurality of openings arranged in a radial row, with each opening slightly offset from one another. The disadvantage of this arrangement is that the seeds in a given row are not released simultaneously. As a result, the seeds are not consistently dropped in a tight group.

Accordingly, it would be desirable to have a seed disc that overcomes the disadvantages described above and to provide a simple, and cost effective multiple drop seed disc apparatus.

SUMMARY OF THE INVENTION

One aspect of the invention provides a multiple seed drop disc comprising a disc member including a vacuum side and a seed side, with the vacuum side including a plurality of spaced-apart recesses formed therein, the seed side including a plurality of clusters formed therein, wherein each cluster includes a plurality of openings which communicate with one of the recesses. The disc may further include a plurality of wear depressions formed in the vacuum side. The disc may preferably be made of a durable plastic, for example, STAT-KON R™. The disc may alternatively be made of Carilon®. The recesses in the vacuum side of the disc may preferably have a circular shape. Each of the clusters may include, for example, four openings. Each opening preferably includes an edge, which is curved. The opening may preferably have a circular shape. The openings may each be chamfered with a standard drill chamfer. The clusters may preferably be equally spaced-apart and positioned adjacent a perimeter region of a disc. The area of each recess may be substantially the same as the combined areas of the openings in a cluster.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

DETAILED DESCRIPTION OF THE PRESENTLY PREFERRED EMBODIMENTS

Figure 1:
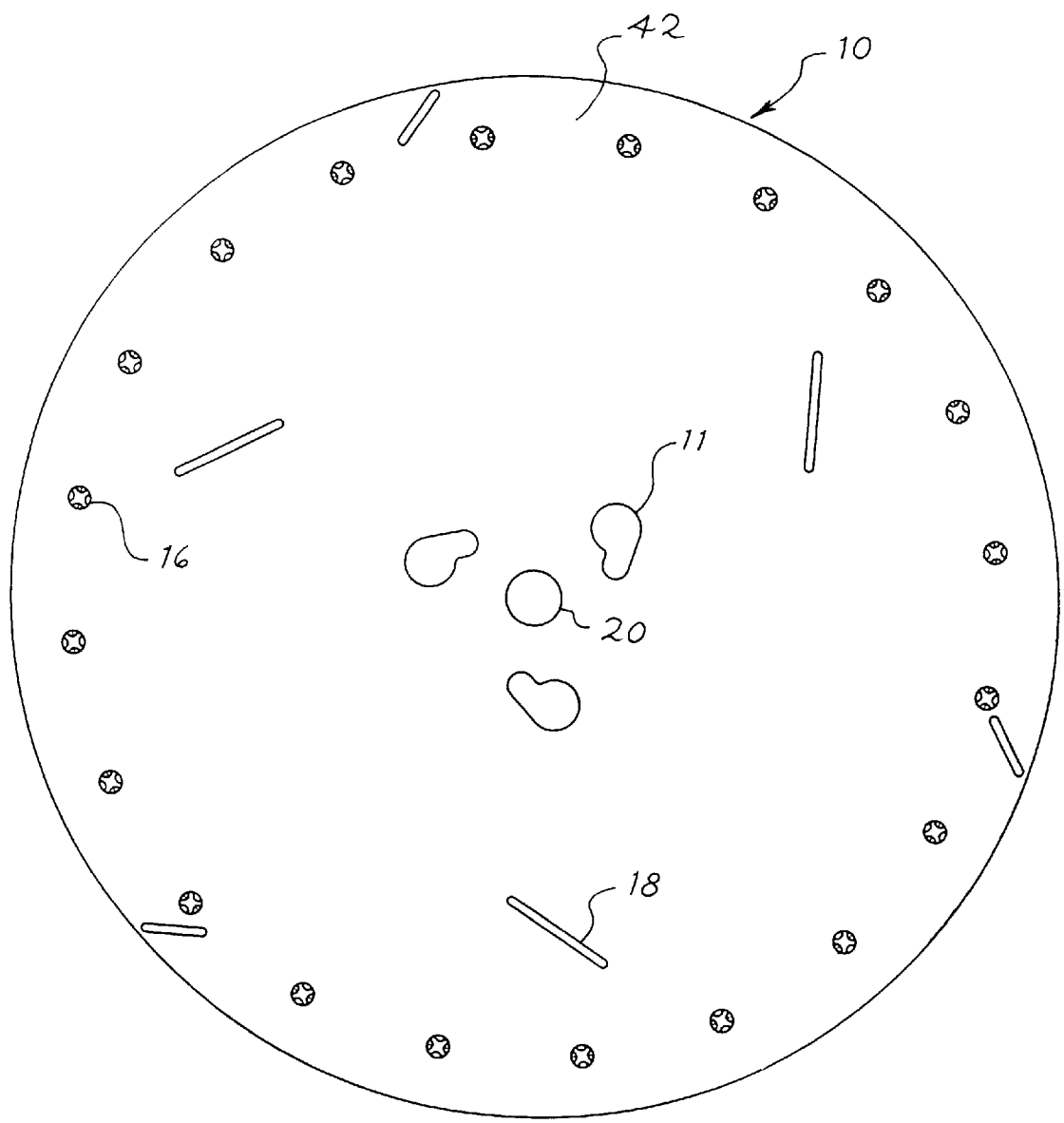
FIG. 1 is a plan view of a vacuum side of a preferred embodiment of a multiple seed drop disc made in accordance with the invention.

Referring to FIGS. 1–4, a preferred embodiment of a multiple seed drop disc is generally shown at 10. The disc 10 is designed to be used in vacuum seed meters. One preferred vacuum seed meter 50 is shown generally in FIG. 5, and is further disclosed in U.S. application Ser. No. 09/061,084, filed Apr. 15, 1998. The disc 10 preferably includes keyed openings 11 to allow the seed disc to be operatively attached to a drive hub 52. The seed disc 10 also preferably includes a center opening 20 which is received on the shaft 54 of the vacuum meter 50 to allow closer tolerance to be held and better alignment between the spools of a singulator 56 and the seed disc 10.

Figure 2:
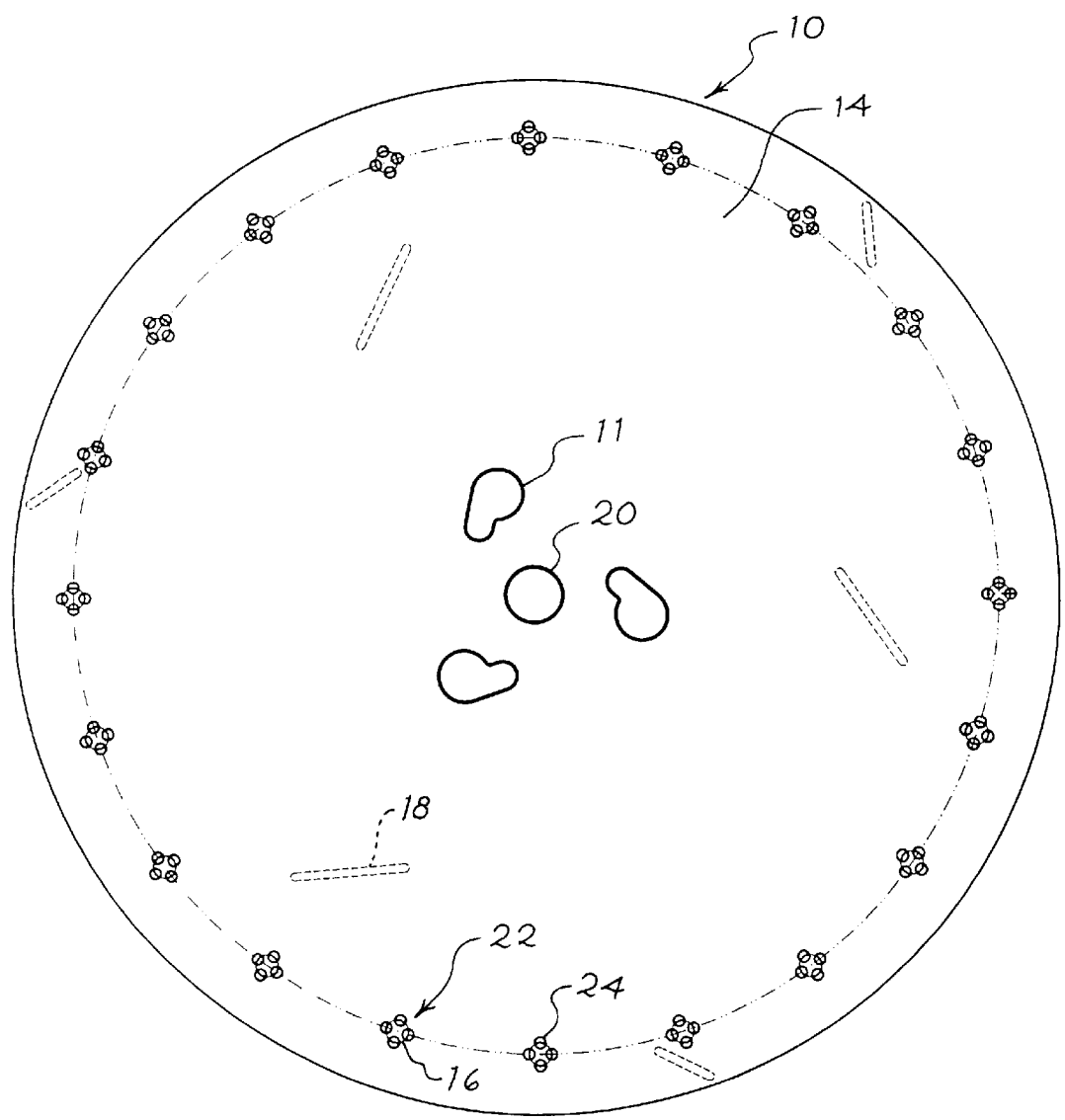
FIG. 2 is a plan view of a seed side of the embodiment of FIG. 1.

The seed disc 10 includes a vacuum side 12 (shown in FIG. 1) and a seed side 14 (shown in FIG. 2). The vacuum side 12 preferably has a planar surface. Formed adjacent the perimeter of the disc 10 in the vacuum side 12 are a plurality of spaced-apart recesses 16. The recesses 16 are oriented to align with the vacuum chamber formed in the seed meter. In the embodiment shown, the recesses 16 are circular-shaped and extend part way through the thickness of the disc 10. The disc 10 may be used as a replacement for the disc 58 shown in FIG. 5.

The vacuum side 12 of the disc 10 also preferably includes a plurality of wear depressions 18 formed therein. As shown in FIG. 1, the wear depressions 18 may, for example, preferably be elongated slots, and are preferably spaced so that the wear depressions 18 extend to where the seed disc 10 is contacted by the vacuum meter cover 62. The wear depressions 18 may preferably extend underneath the contact surface into the vacuum chamber 64 to create airflow under the contact surface to allow cooling of the contact surfaces. The wear depressions 18 may also channel debris away from the contact surfaces. In the embodiment shown, the wear depressions 18 may preferably be angled with respect to the radius of the seed disc 10 to aid in debris removal. For example, the wear depressions 18 may be angled at approximately 45 degrees, although other angles may be adequate. The size, shape, and orientation of the wear depressions 18 may vary depending on the particular application. Various other configurations of the wear depressions, including, for example, curved depressions are contemplated.

Figure 3:
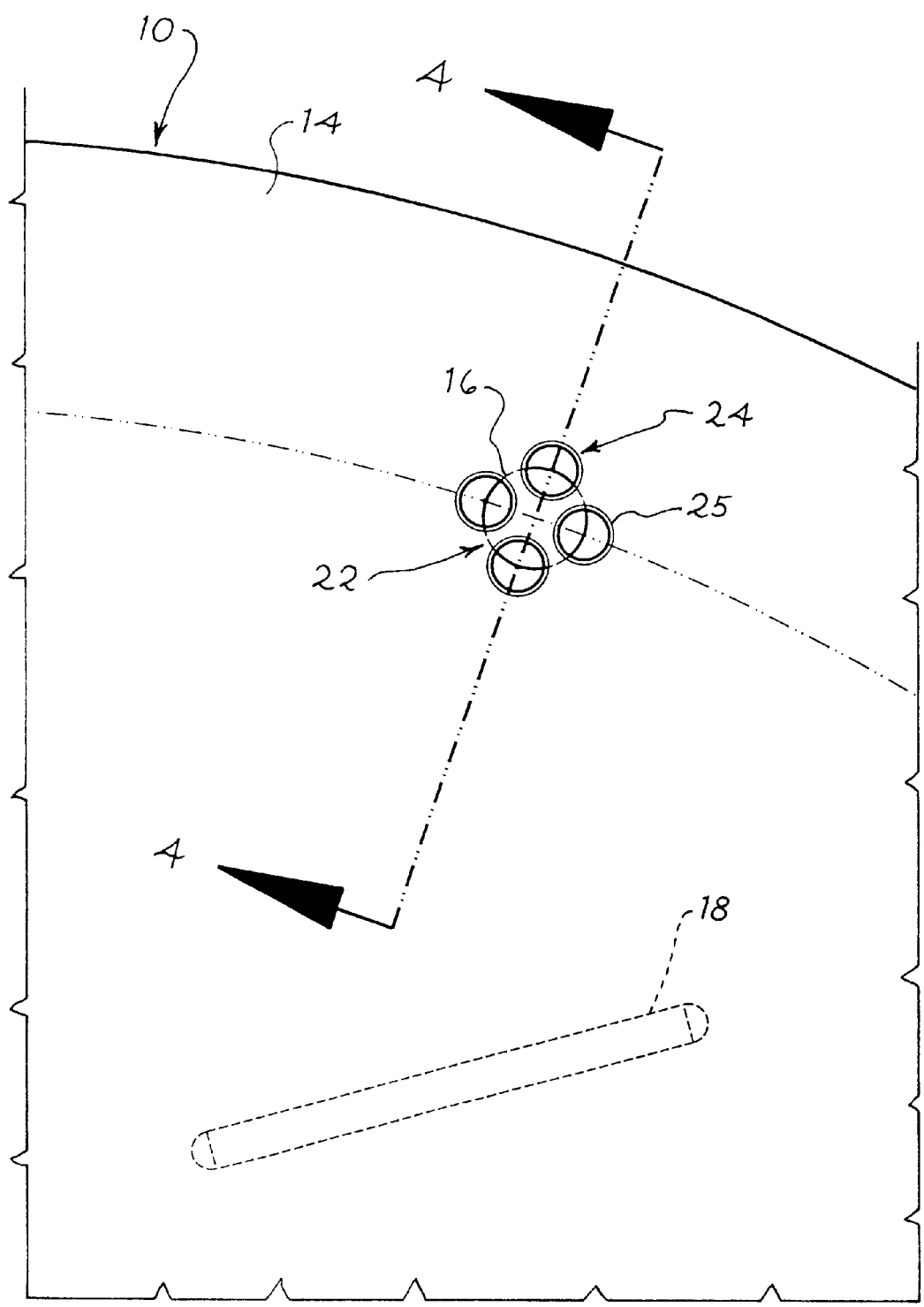
FIG. 3 is an enlarged view of one cluster of seed openings of FIG. 2.
Figure 4:
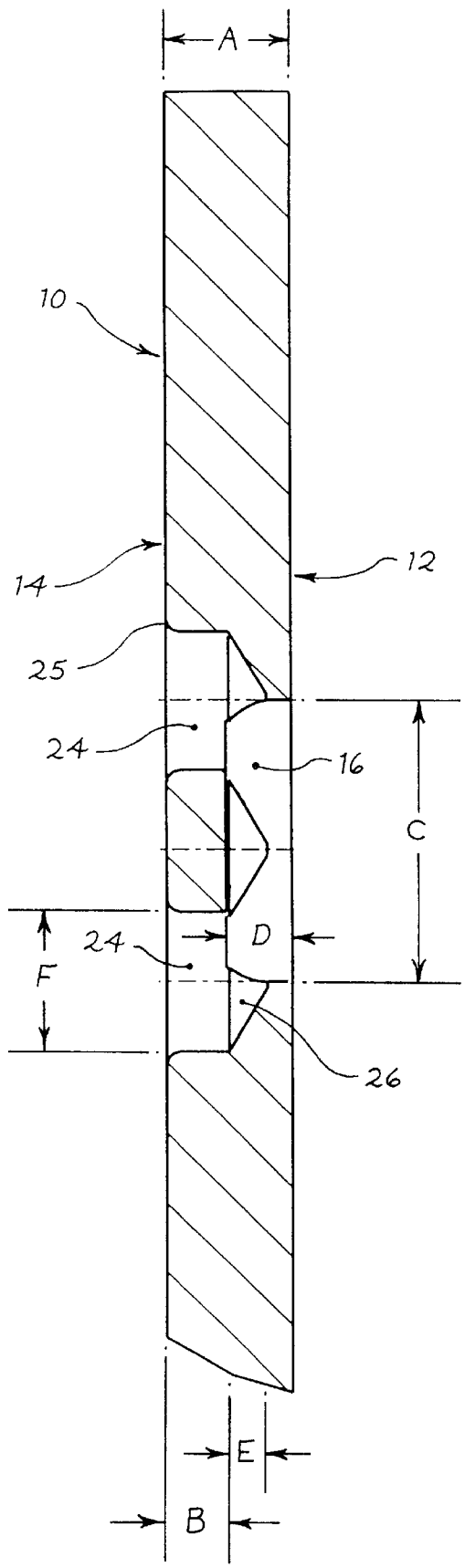
FIG. 4 is a sectional view taken through line 4—4 of FIG. 3.
Figure 5:
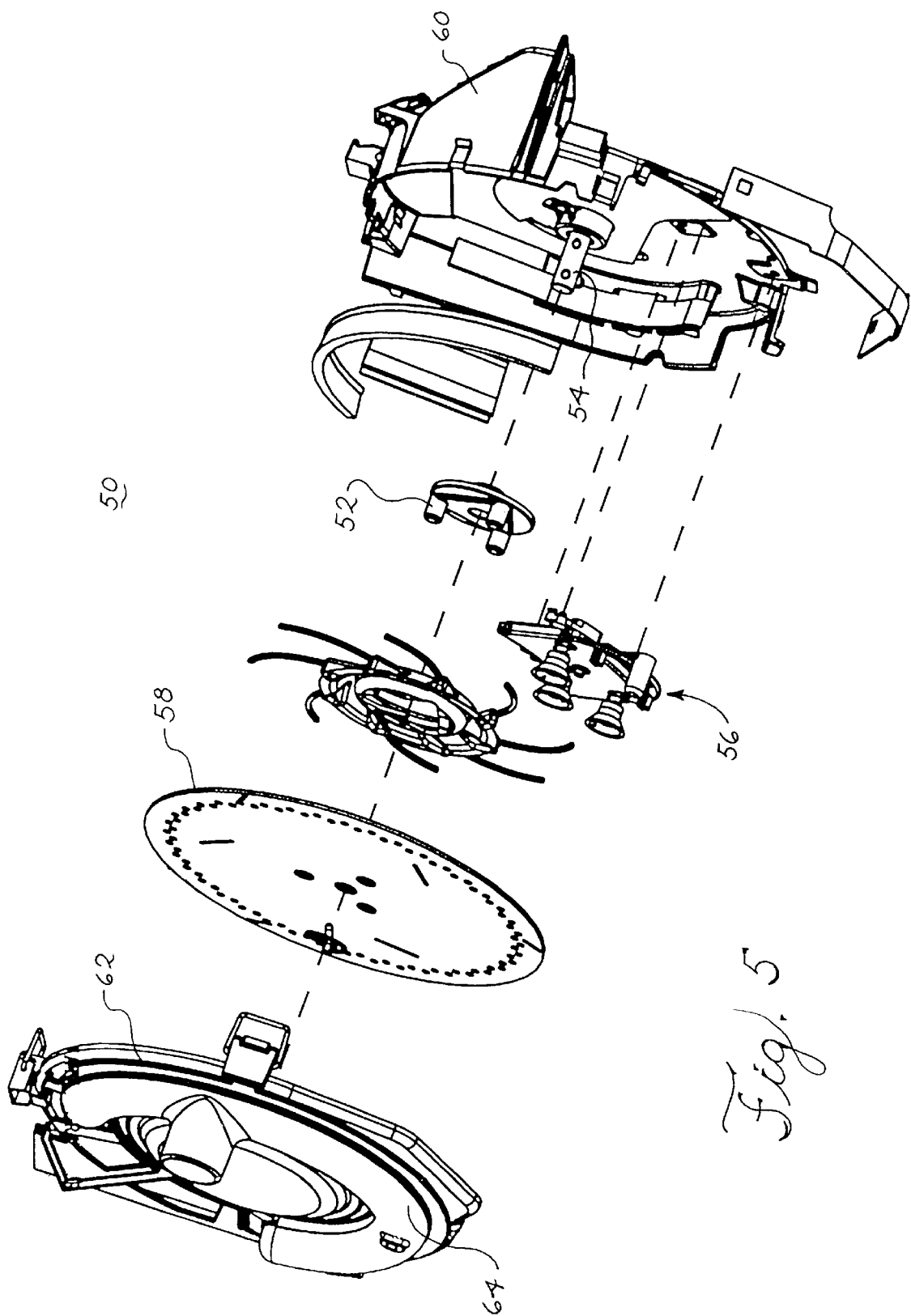
FIG. 5 is an exploded view of a vacuum meter.

Referring to FIGS. 2–4, the seed side 14 of the disc 10 also preferably has a planar surface. A plurality of equally spaced-apart clusters 22 are formed through the seed side 14 adjacent the perimeter of the disc 10 and opposite the recesses 16. Each of the clusters 22 preferably includes two or more openings 24 depending on the particular application. In the embodiment shown, four openings 24 are provided in each cluster 22. The openings 24 may preferably be circular-shaped. The edge 25 of each opening 24 preferably is curved to prevent seeds from sticking. In one embodiment, the radius of edge 25 is approximately 0.3 mm. As shown in FIG. 4, the openings 24 may preferably include a standard drill chamfer 26. The recesses 16 are also preferably circular-shaped. As shown in FIG. 3, the recess 16 (shown in phantom) interconnects with each of the openings 24. In a preferred embodiment, the area of the recess 16 is substantially the same as the combined area of each of the openings 24 in the interconnected cluster 22. For example, in a preferred embodiment used for cottonseeds, the seed disc 10 includes the following dimensions: A=3.0 mm, B=1.4 mm, C=6.0 mm, D=1.5 mm, E=0.87 mm and F=3.0 mm. The interconnection between the openings 24 and communicating recess 16 is sufficient to allow the vacuum force to hold a seed within each of the openings 24.

In operation, a vacuum force is applied to vacuum chamber 64 and the vacuum force is simultaneously applied to all four openings 24 of a given cluster 22 to hold four seeds, which are stored within the housing 60. As the recess 16 opposite the seed openings rotates out of the vacuum chamber 64, the vacuum force applied to all four seeds is cut-off simultaneously allowing all four seeds to fall from the seed disc 10 with negligible time delay between the seeds. This allows all four seeds to be dropped in a tight group which is desirable in certain applications including, for example, "hill drop" cotton planting.

The seed disc 10 is preferably made of a durable plastic, for example, STAT-KON R™ available from LNP Engineering Plastics. The seed disc 10 may alternatively be comprised of aliphatic polyketones including, for example, Carilon® polymers manufactured by the Shell Chemical Company. Additives such as carbon fibers, carbon powder or stainless steel fibers may be added to the Carilon® polymer to make the seed disc 10 resistant to static charge build-up or to make it electrically conductive. Carilon® has been found to provide excellent wear for pressure-velocity and abrasive applications, good dimensional stability, good lubricity and good seed handling properties.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A multiple seed drop disc comprising:
   a disc member including a vacuum side and seed side, the vacuum side including a plurality of spaced apart recesses formed therein, the seed side including a plurality of clusters formed therein, each cluster including a plurality of openings which communicate with one of the recesses.

2. The disc of claim I further comprising a plurality of wear depressions formed in the vacuum side.

3. The disc of claim 1 wherein the disc member comprises an aliphatic polyketone.

4. The disc of claim 1 wherein the disc member comprises plastic.

5. The disc of claim 1 wherein each of the recesses have a circular shape.

6. The disc of claim 1 wherein each of the clusters include four openings.

7. The disc of claim 1 wherein the seed disc includes a curved edge along the perimeter of each of the openings.

8. The disc of claim 1 wherein the openings include a chamfer.

9. The disc of claim 1 wherein the clusters are equally spaced and positioned adjacent a perimeter region of the disc.

10. The disc of claim 1 wherein the openings have a circular shape.

11. The disc of claim 1 wherein the area of each recess is substantially the same as the combined areas of the openings in a cluster.

* * * * *